US012773955B2

(12) United States Patent
Mei et al.

(10) Patent No.: US 12,773,955 B2
(45) Date of Patent: Oct. 27, 2026

(54) QUICK-MOUNTING QUICK-RELEASE VEHICLE ROOF RACK CROSS BAR

(71) Applicant: JIAXING MINTH MACHINERY CO., LTD., Jiaxing (CN)

(72) Inventors: Jun Mei, Ningbo (CN); Xiao Zhang, Ningbo (CN); Jiabin Wei, Ningbo (CN); Jiandong Sun, Ningbo (CN); Shilong Ran, Ningbo (CN)

(73) Assignee: JIAXING MINTH MACHINERY CO., LTD., Jiaxing (CN)

( * ) Notice: Subject to any disclaimer, the term of this patent is extended or adjusted under 35 U.S.C. 154(b) by 122 days.

(21) Appl. No.: 18/688,579

(22) PCT Filed: Feb. 23, 2022

(86) PCT No.: PCT/CN2022/077375

§ 371 (c)(1),
(2) Date: Mar. 1, 2024

(87) PCT Pub. No.: WO2023/040194

PCT Pub. Date: Mar. 23, 2023

(65) Prior Publication Data

US 2024/0367590 A1 Nov. 7, 2024

(30) Foreign Application Priority Data

Sep. 15, 2021 (CN) ......................... 202111077883.2

(51) Int. Cl.
*B60R 9/058* (2006.01)

(52) U.S. Cl.
CPC .................................... *B60R 9/058* (2013.01)

(58) Field of Classification Search
CPC ................................ B60R 9/058; B60R 9/052
(Continued)

(56) References Cited

U.S. PATENT DOCUMENTS 4,432,479 A * 2/1984 Graber .................... B60R 9/058 224/322
5,785,474 A * 7/1998 Kinouchi ................ B60R 9/058 224/329
(Continued)

FOREIGN PATENT DOCUMENTS

CN 206264933 U 6/2017
CN 210454661 U 5/2020
(Continued)

OTHER PUBLICATIONS

International Search Report dated Jun. 9, 2022 from PCT Application No. PCT/CN2022/077375 (7 pp).

*Primary Examiner* — Scott T Mcnurlen
(74) *Attorney, Agent, or Firm* — INNOVATION CAPITAL LAW GROUP, LLP; Vic Lin

(57) ABSTRACT

A quick-mounting quick-release vehicle roof rack cross bar, comprising: a rack body, wherein a base is sleeved outside an end of the rack body, and the base is provided with a first abutting portion; a mounting plate, which is arranged on the base, wherein the mounting plate is provided with an arc groove and a transverse groove; a moving plate, wherein one end of the moving plate is movably connected to the arc groove, the other end of the moving plate is provided with a transverse shaft, the transverse shaft is movably connected to the transverse groove, and the moving plate is provided with a second abutting portion; and a locking plate, which is rotationally connected to the mounting plate, wherein an end of the locking plate is rotationally connected to the transverse shaft.

5 Claims, 6 Drawing Sheets

(58) Field of Classification Search
USPC .......................................... 224/325, 329, 331
See application file for complete search history.

(56) References Cited

U.S. PATENT DOCUMENTS

| | | | | |
|---|---|---|---|---|
| 8,393,507 | B2 * | 3/2013 | Aftanas | B60R 9/058 224/315 |
| 9,371,041 | B2 * | 6/2016 | Almhill | B60R 9/058 |
| 9,688,211 | B2 * | 6/2017 | Schierk | B60R 9/058 |
| 9,975,495 | B2 * | 5/2018 | Almhill | B60R 9/058 |
| 10,723,277 | B2 * | 7/2020 | Aftanas | F16B 2/10 |
| 12,377,788 | B2 * | 8/2025 | Larsson | B60R 9/058 |

FOREIGN PATENT DOCUMENTS

| | | | | | |
|---|---|---|---|---|---|
| CN | 213007907 | U | | 4/2021 | |
| CN | 213384076 | U | | 8/2021 | |
| CN | 113799701 | A | | 12/2021 | |
| DE | 102011083358 | A1 | * | 3/2013 | B60R 9/058 |
| EP | 2216205 | A1 | | 8/2010 | |
| EP | 3243702 | A1 | * | 11/2017 | B60R 9/058 |
| JP | 60056651 | A | * | 4/1985 | |
| JP | H0769137 | A | | 3/1995 | |
| SE | 200601485 | A | * | 8/2007 | |
| WO | WO-9421491 | A1 | * | 9/1994 | B60R 9/058 |
| WO | WO-2008004936 | A1 | * | 1/2008 | B60R 9/058 |

* cited by examiner

QUICK-MOUNTING QUICK-RELEASE VEHICLE ROOF RACK CROSS BAR

TECHNICAL FIELD

The invention belongs to the field of automotive parts, and particularly relates to a quick-mounting quick-release vehicle roof rack cross bar.

DESCRIPTION OF RELATED ART

At early stage, racks are mainly applied to SUVs. With the diversification of people's requirements for vehicles and the continuous increase of the capacity of the vehicle repacking market, more and more racks are applied to pickup trucks, CUVs, crossover vehicles and some small vehicles. The rack of cross-country vehicles is generally used for carrying items that cannot be placed in the trunk, such as large-sized luggage, bikes and folding beds. More items can be carried as long as they are secured in position, particularly in the presence of a luggage rope net on the items.

However, because the rack is directly welded or threadedly fixed to the vehicle roof, the rack cannot be detached and is inconvenient to use; and perforation or other operations need to be performed on the vehicle body, and water leaking is extremely likely to occur at perforated positions with the use of vehicles.

BRIEF SUMMARY OF THE INVENTION

In view of the current situation of the prior art, the technical issue to be settled by the invention is to provide a quick-mounting quick-release vehicle roof rack cross bar.

The technical solution adopted by the invention to settle the above technical issue is as follows: a quick-mounting quick-release vehicle roof rack cross bar comprises: a rack body, wherein a base is sleeved outside an end of the rack body, and the base is provided with a first abutting portion;

a mounting plate arranged on the base, wherein the mounting plate is provided with an arc groove and a transverse groove;

a moving plate, wherein one end of the moving plate is movably connected to the arc groove, the other end of the moving plate is provided with a transverse shaft, the transverse shaft is movably connected to the transverse groove, and the moving plate is provided with a second abutting portion; and a locking plate rotationally connected to the mounting plate, wherein an end of the locking plate is rotationally connected to the transverse shaft;

when a rotating plate is rotated, the moving plate is driven to move along the arc groove;

when the rotating plate is rotated to be flush with the mounting plate, the moving plate is locked.

In the quick-mounting quick-release vehicle roof rack cross bar, a connecting plate is rotatably connected to the locking plate, an end of the connecting plate is rotatably connected to the mounting plate, and a joint of the connecting plate and the mounting plate is located between the arc groove and the transverse groove.

In the quick-mounting quick-release vehicle roof rack cross bar, a mechanical lock is arranged on the base, a link shaft is arranged at an end of the mechanical lock and movably penetrates through the mounting plate, and a first opening is formed in the locking plate;

in a case where the locking plate is rotated to be flush with the mounting plate, the link shaft is driven to disengage from the first opening when the mechanical lock is rotated.

In the quick-mounting quick-release vehicle roof rack cross bar, a connecting ring is rotatably arranged on the mounting plate, one end of the cover plate is movably clamped on the connecting ring, the other end of the cover plate is movably clamped on the base, a second opening is formed in the cover plate and is flush with the first opening, the link shaft is movably arranged in the second opening, and when the mechanical lock is rotated, the link shaft is driven to disengage from the second opening.

In the quick-mounting quick-release vehicle roof rack cross bar, a through-hole is formed in the locking plate, a bump is arranged on the cover plate and movably penetrates through the through-hole, and the second opening is formed in the bump.

In the quick-mounting quick-release vehicle roof rack cross bar, a plurality of friction pads are uniformly arranged on the first abutting portion.

Compared with the prior art, the invention has the following advantages: the quick-mounting quick-release vehicle roof rack cross bar can be easily detached from a vehicle body and can be connected to the vehicle body without perforation, and the self-locking structure of the locking plate guarantees a stable connection between a rack and the vehicle body, thus improving safety performance.

In the FIGS.: 1, rack body; 2, base; 3, first abutting portion; 4, mounting plate; 5, arc groove; 6, transverse groove; 7, moving plate; 8, transverse shaft; 9, second abutting portion; 10, locking plate; 11, connecting plate; 12, mechanical lock; 13, link shaft; 14, first opening; 15, cover plate; 16, connecting ring; 17, second opening; 18, bump; 19, through-hole; 20, friction pad.

DETAILED DESCRIPTION OF THE INVENTION

The technical solution of the invention is further described below in conjunction with specific embodiments and accompanying drawings of the embodiments, but the invention is not limited to the following embodiments.

Figure 1:
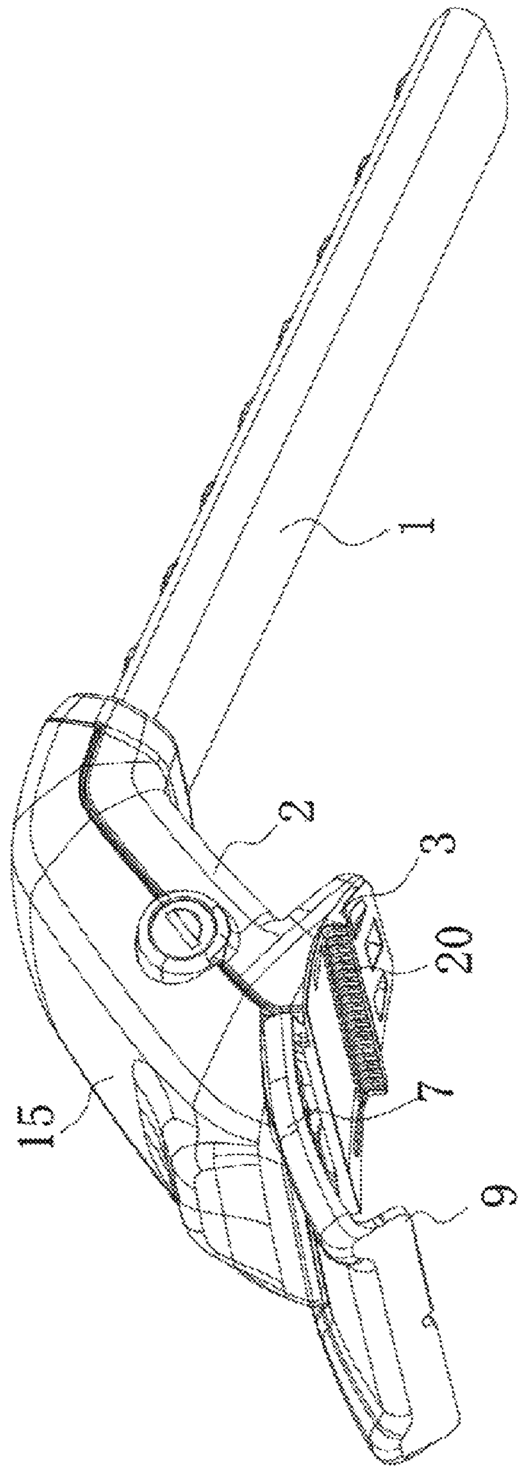
FIG. 1 is a three-dimensional view of a quick-mounting quick-release vehicle roof rack cross bar.
Figure 2:
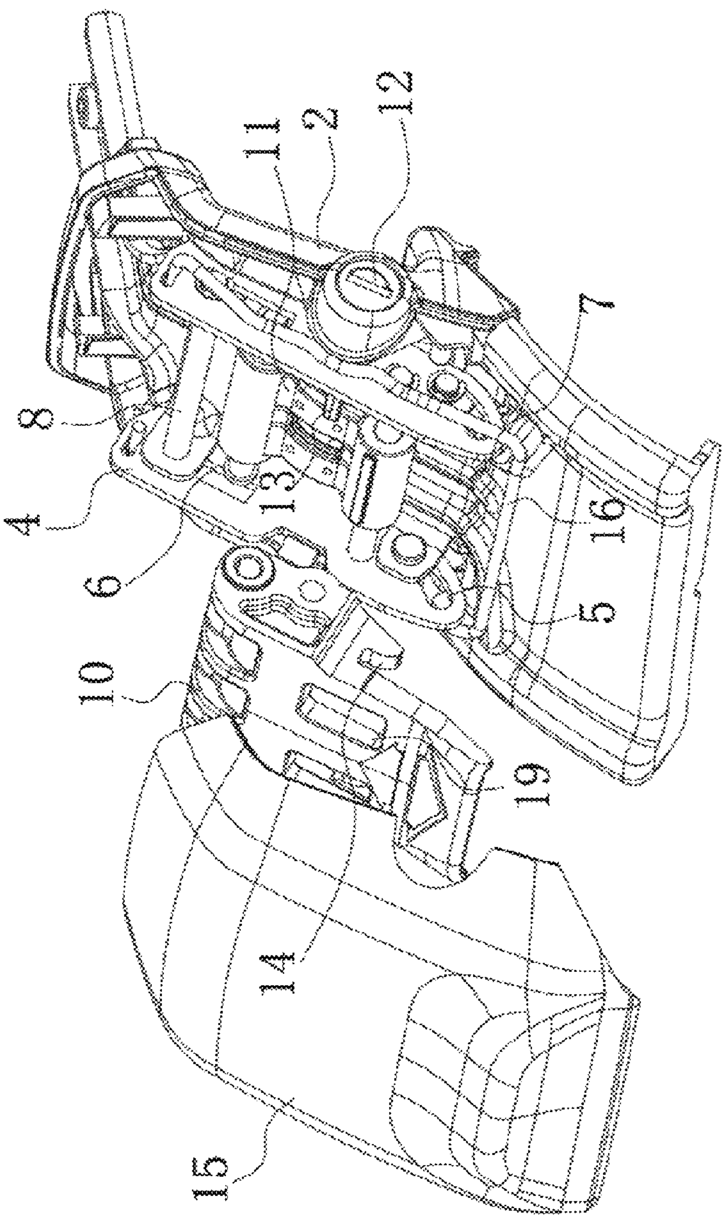
FIG. 2 is an exploded view of the quick-mounting quick-release vehicle roof rack cross bar.
Figure 3:
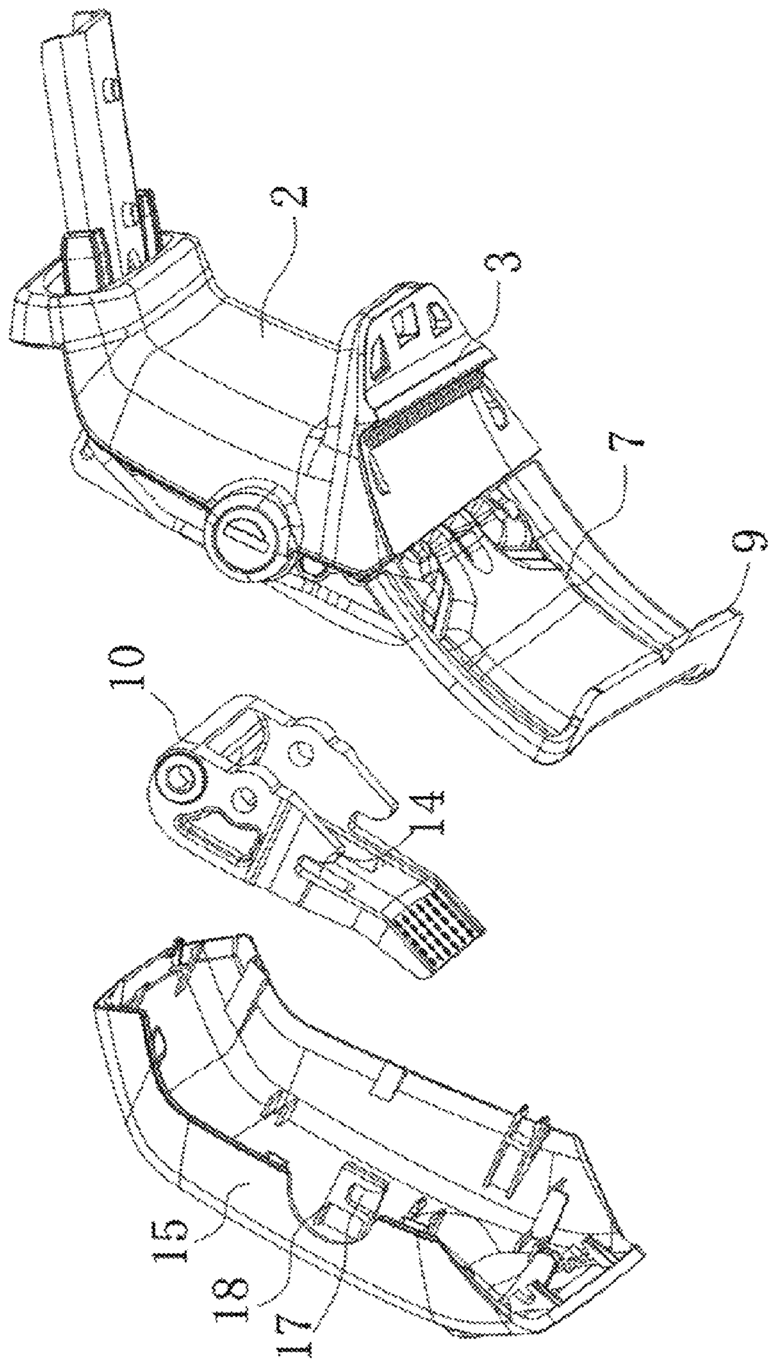
FIG. 3 is an exploded view of the quick-mounting quick-release vehicle roof rack cross bar, from another perspective.
Figure 4:
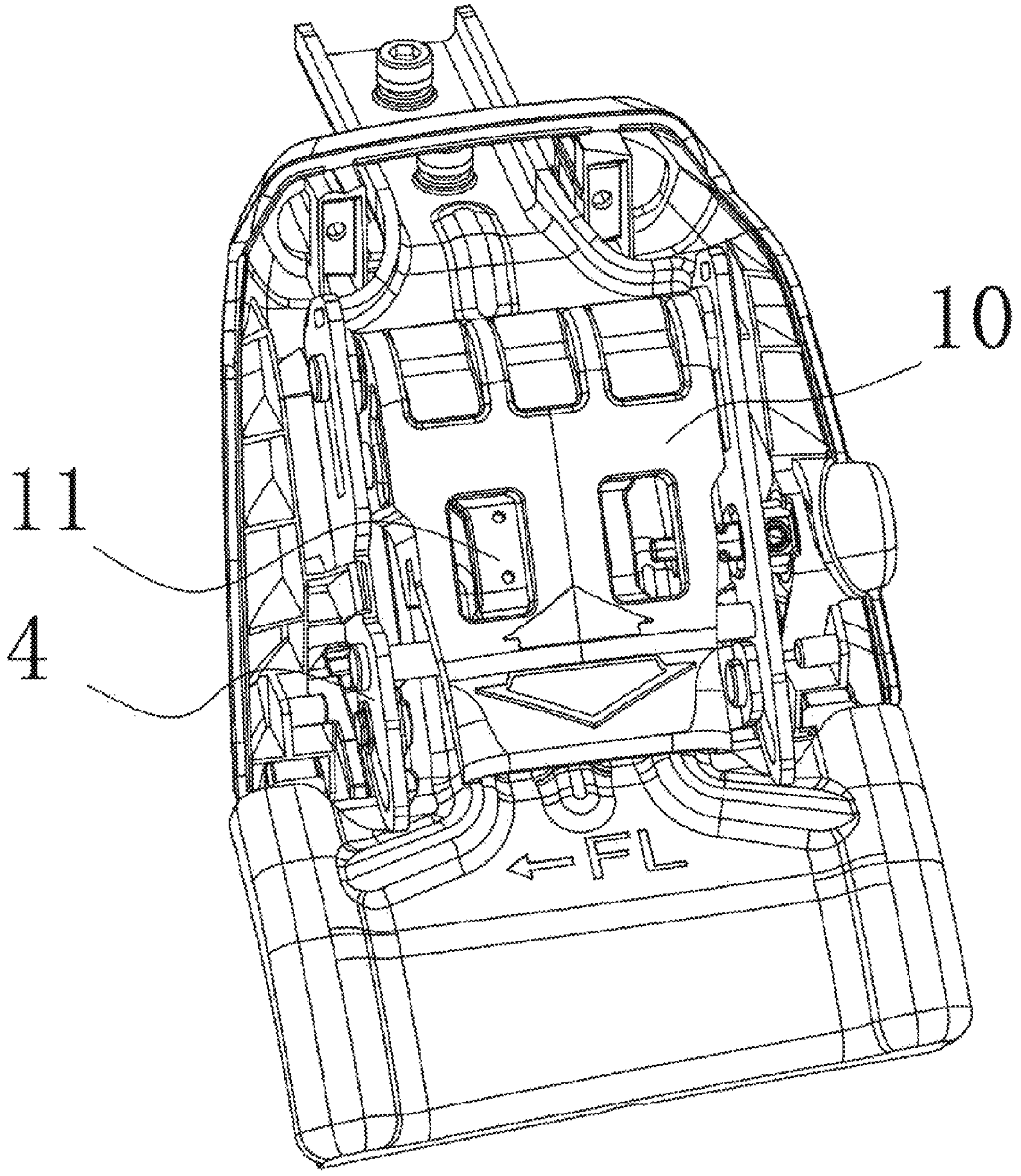
FIG. 4 is an internal structure view of the quick-mounting quick-release vehicle roof rack cross bar.
Figure 5:
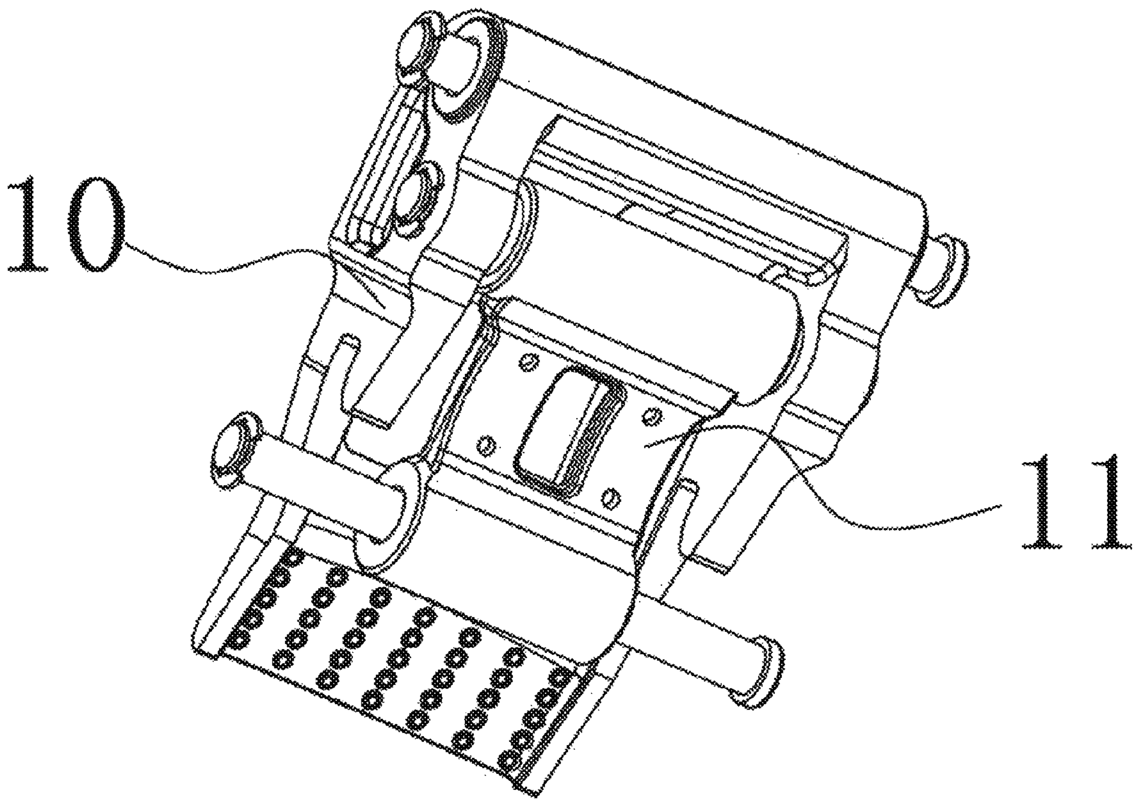
FIG. 5 is a connection state view of the connecting plate and the locking plate.
Figure 6:
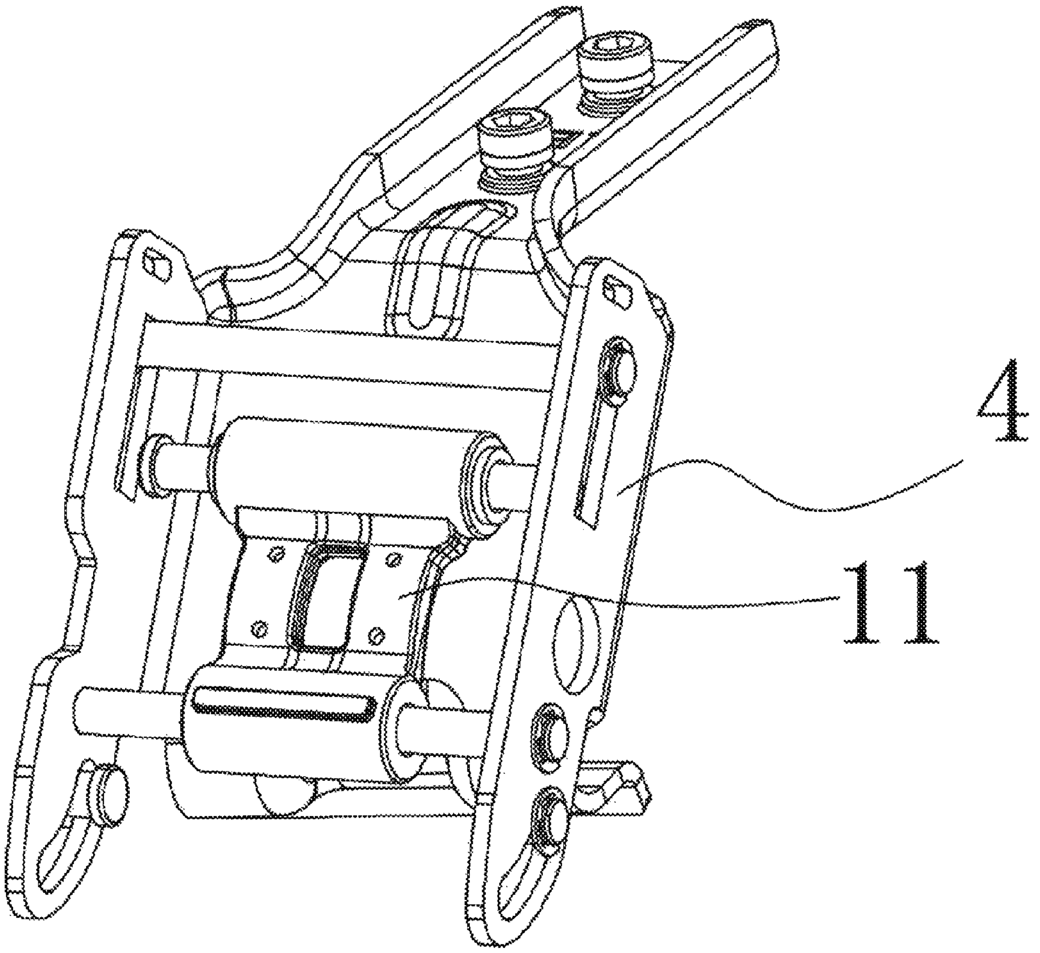
FIG. 6 is a connection state view of the connecting plate and the mounting plate.

As shown in FIGS. 1-6, a quick-mounting quick-release vehicle roof rack cross bar comprises: a rack body 1, wherein a base 2 is sleeved outside an end of the rack body 1, and the base 2 is provided with a first abutting portion 3; a mounting plate 4 arranged on the base 2, wherein the mounting plate 4 is provided with an arc groove 5 and a transverse groove 6; a moving plate 7, wherein one end of the moving plate 7 is movably connected to the arc groove 5, the other end of the moving plate 7 is provided with a transverse shaft 8, the transverse shaft 8 is movably connected to the transverse groove 6, and one end of the moving plate 7 is provided with a second abutting portion 9; and a locking plate 10 rotationally connected to the mounting plate 4, wherein an end of the locking plate 10 is rotationally connected to the transverse shaft 8; when the locking plate 10 is rotated, the moving plate 7 is driven to move along the arc groove 5; and when the locking plate 10 is rotated to be flush with the mounting plate 4, the moving plate 7 is locked.

The base 2 is arranged on the rack body 1 and provided with the first abutting portion 3 which can abut against one side of a door frame of a vehicle body, and the moving plate 7 is provided with the second abutting portion 9 which can abut against the other side of the door frame of the vehicle body; when the second abutting portion 9 is close to the first abutting portion 3, the distance between the second abutting portion 9 and the first abutting portion 3 is decreased, and the first abutting portion 3 and the second abutting portion 9 firmly clamp the door frame, thus fixing the rack body 1 to the vehicle body; the moving plate 7 is movably connected to the arc groove 5, one end of the locking plate 10 is connected to the moving plate 7, and the locking plate 10 is rotatably connected to the mounting plate 4; when the locking plate 10 is rotated around a joint of the locking plate 10 and the mounting plate 4, the moving plate 7 is driven to move along a path specified by the arc groove 5 to allow the second abutting portion 9 to move close to or away from the first abutting portion 3; and when the second abutting portion 9 moves away from or close to the first abutting portion 3, the vertical height of the second abutting portion 9 will change accordingly. In this way, during installation, the second abutting portion 9 can move downwards to increase the distance between the first abutting portion 3 and the second abutting portion 9 to facilitate installation.

When the locking plate 10 is rotated to be flush with the mounting plate 4, a joint of the moving plate 7 and the transverse groove 6 and a joint of the moving plate 7 and the arc groove 5 are located on sides, close to the rack body 1, of the transverse groove 6 and the arc groove 5, at this moment, the locking plate 10 abuts against the moving plate 7, and the locking plate 7 is locked; because the locking plate 10 is flush with the mounting plate 4 at this moment and one end of the locking plate 10 is rotatably connected to the transverse plate 8, the joint of the locking plate 10 and the mounting plate 4 is located on a same line as the joint of the locking plate 10 and the moving plate 7, and the locking plate 10 is connected to the transverse plate 8 on the moving plate 7, so a force applied to the moving plate 7 will be transferred to the locking plate 10, the locking plate 10 cannot be driven to move, that is, the moving plate cannot move transversely. In this way, the moving plate 7 cannot move even if a force is applied to the moving plate 7, thus guaranteeing a stable connection between a rack and a vehicle body.

When the rack needs to be detached, the locking plate 10 is pulled upwards; and when the locking plate 10 is rotated, one end of the moving plate 7 is driven to move along the transverse groove 6, and the other end of the moving plate 7 is driven to move along the arc groove 5, such that the second abutting portion 9 is driven to move away from the first abutting portion 3.

A connecting plate 11 is rotatably connected to the locking plate 10, an end of the connecting plate 11 is rotatably connected to the mounting plate 4, and a joint of the connecting plate 11 and the mounting plate 4 is located between the arc groove 5 and the transverse groove 6.

When the locking plate 10 is flush with the mounting plate 4, a joint of the connecting plate 11 and the moving plate 7 is located on a same line as the joint of the connecting plate 11 and the mounting plate 4, such that the moving plate 7 cannot move. When the locking plate 10 needs to be unlocked, the locking plate 10 is rotated, the joint of the locking plate 10 and the connecting plate 11 rotates, the joint of the connecting plate 11 and the mounting plate 4 rotates, such that the connecting plate 11, the locking plate 10 and the mounting plate 4 change from the linear state to a triangular state; because one end of the locking plate 10 is connected to the moving plate 7 and one end of the moving plate 7 is arranged in the transverse groove 6 and can move, the position of one end of the locking plate 10 with respect to the mounting plate 4 can be changed, thus providing a space for the locking plate 10 to move.

A mechanical lock 12 is arranged on the base 2, a link shaft 13 is arranged at an end of the mechanical lock 12, the link shaft 13 movably penetrates through the mounting plate 4, a first opening 14 is formed in the locking plate 10, the link shaft 13 movably penetrates into the first opening 14, and the when the mechanical lock 12 is rotated, the link shaft 13 can be driven to disengage from the first opening 14.

The mechanical lock 12 can be unlocked or locked with a key. When the mechanical lock 12 is unlocked with a key, the link shaft 13 is driven to rotate to enter or disengage from the first opening 14. When the link shaft 13 enters the first opening 14, the locking plate 10 will not rotate even if a force is applied to the locking plate 10, thus further improving the connection stability of the rack and the vehicle body in use. When the link shaft 13 disengages from the first opening, the locking plate 10 can be rotated to detach the rack from the vehicle body. In this way, the rack is unlikely to be be stolen.

A connecting ring 16 is rotatably arranged on the mounting plate 4, one end of the cover plate 15 is movably clamped on the connecting ring 16, the other end of the cover plate 15 is movably clamped on the base 2, a second opening 17 is formed in the cover plate 15, and the link shaft 13 is movably arranged in the second opening 17. When the mechanical lock 12 is rotated, the link shaft 13 can be driven to disengage from the second opening 17.

The cover plate 15 can cover the mounting plate 4 and the locking plate 10, thus improving aesthetics; the second opening 17 is formed in the cover plate 15, and the link shaft 13 is movably arranged in the second opening 17; and in a case where the mechanical lock 12 is locked, the cover plate 15 cannot be detached, thus preventing the locking plate 10 from being unlocked due to mistouch.

A through-hole 19 is formed in the locking plate 10, a bump 18 is arranged on the cover plate 15 and movably penetrates through the through-hole 19, and the second opening 17 is formed in the bump 18.

The bump 18 is arranged on the cover plate 15 and penetrates through the through-hole 19, and the second opening 17 is formed in the bump 18, such that the link shaft 13 can synchronously stretch into the second opening 17 and the first opening 14, and the cover plate 15 and the locking plate 10 can be unlocked or locked by means of the mechanical lock 12.

A plurality of friction pads 20 are uniformly arranged on the first abutting portion 3. The friction pads 20 can improve the friction of the vehicle body and protect the vehicle body against scratches.

It should be noted that all directional indications (such as "upper", "lower", "left", "right", "front" and "back") in the embodiments of the invention are merely used for explaining the relative positional relationship and motion between components at a certain pose (as shown), and if the specific pose changes, these directional indications will change accordingly.

In addition, descriptions such as "first", "second", "one" in the invention are merely for the description of purpose, and should not be construed as indicting or implying relative importance or implicitly indicating the number of technical features referred to. Therefore, a feature defined by "first" or "second" may explicitly or implicitly refer to the inclusion of more or one said feature. In the description of the invention, "multiple" refers to at least two such as two or three, unless otherwise expressly defined.

In the invention, terms such as "connect" and "fix" should be broadly understood, unless otherwise expressly stated and defined. For example, "connect" may refer to fixed connection, detachable connection or integrated connection; or, mechanical connection or electrical connection; or, direct connection, indirect connection through an intermediate medium, or internal connection or interaction of two elements, unless otherwise expressly defined. Those ordinarily skilled in the art can understand the specific meanings of these terms in the invention as the case may be.

In addition, the technical solutions of the embodiments of the invention can be mutually combined as long as the combinations can be implemented by those ordinarily skilled in the art. If a combination of the technical solutions is contradictory or cannot be implemented, this combination should be regarded as non-existent and should not fall within the protection scope of the invention.

What is claimed is:

1. A quick-mounting quick-release vehicle roof rack cross bar, comprising:

a rack body, wherein a base is sleeved outside an end of the rack body, and the base is provided with a first abutting portion;

a mounting plate arranged on the base, wherein the mounting plate is provided with an arc groove and a transverse groove;

a moving plate, wherein one end of the moving plate is movably connected to the arc groove, the other end of the moving plate is provided with a transverse shaft, the transverse shaft is movably connected to the transverse groove, and the moving plate is provided with a second abutting portion; and a locking plate rotationally connected to the mounting plate, wherein an end of the locking plate is rotationally connected to the transverse shaft;

when the locking plate is rotated, the moving plate being driven to move along the arc groove;

when the locking plate is rotated to be flush with the mounting plate, the moving plate being locked;

a connecting plate having a first end rotatably connected to the locking plate and a second end rotatably connected to the mounting plate, and a joint of the connecting plate and the mounting plate is located between the arc groove and the transverse groove.

2. The quick-mounting quick-release vehicle roof rack cross bar according to claim 1, wherein a mechanical lock is arranged on the base, a link shaft is arranged at an end of the mechanical lock and movably penetrates through the mounting plate, and a first opening is formed in the locking plate;

in a case where the locking plate is rotated to be flush with the mounting plate, the link shaft is driven to disengage from the first opening when the mechanical lock is rotated.

3. The quick-mounting quick-release vehicle roof rack cross bar according to claim 2, wherein a connecting ring is rotatably arranged on the mounting plate, one end of a cover plate is movably clamped on the connecting ring, the other end of the cover plate is movably clamped on the base, a second opening is formed in the cover plate and is flush with the first opening, the link shaft is movably arranged in the second opening, and when the mechanical lock is rotated, the link shaft is driven to disengage from the second opening.

4. The quick-mounting quick-release vehicle roof rack cross bar according to claim 3, wherein a through-hole is formed in the locking plate, a bump is arranged on the cover plate and movably penetrates through the through-hole, and the second opening is formed in the bump.

5. The quick-mounting quick-release vehicle roof rack cross bar according to claim 1, wherein a plurality of friction pads are uniformly arranged on the first abutting portion.

* * * * *